(12) United States Patent
von Stackelberg, Jr.

(10) Patent No.: US 6,767,380 B2
(45) Date of Patent: Jul. 27, 2004

(54) DRUM LID FOR MINIMAL LIQUID CARRYOVER IN A VACUUM SYSTEM

(76) Inventor: Roland von Stackelberg, Jr., 192 Sackville Dr. S.W., Calgary, Alberta T2W 0W6 (CA)

( * ) Notice: Subject to any disclaimer, the term of this patent is extended or adjusted under 35 U.S.C. 154(b) by 0 days.

(21) Appl. No.: 10/289,349

(22) Filed: Nov. 7, 2002

(65) Prior Publication Data

US 2004/0089157 A1 May 13, 2004

(51) Int. Cl.[7] .............................................. B01D 45/08
(52) U.S. Cl. ............................ 55/431; 15/353; 55/439; 55/465; 55/DIG. 3; 96/406; 96/416
(58) Field of Search ........................ 55/431, 439, 465, 55/462, DIG. 3; 96/406, 204, 206, 220, 416; 15/353

(56) References Cited

U.S. PATENT DOCUMENTS

| | | | | |
|---|---|---|---|---|
| 1,234,316 A | * | 7/1917 | Elliott | 55/462 |
| 2,205,336 A | * | 6/1940 | Beach | 210/519 |
| 2,327,553 A | * | 8/1943 | Ponselle | 55/438 |
| 2,785,055 A | * | 3/1957 | Redcay | 423/500 |
| 3,402,529 A | * | 9/1968 | Frantz | 55/315.2 |
| 4,469,498 A | * | 9/1984 | Fish | 55/335 |
| 4,847,943 A | * | 7/1989 | Blase et al. | 15/352 |
| 5,525,396 A | | 6/1996 | Rudolph et al. | 428/131 |
| 5,954,863 A | * | 9/1999 | Loveless et al. | 96/321 |
| 5,970,573 A | | 10/1999 | Lahaye | 15/321 |
| 6,210,457 B1 | | 4/2001 | Siemers | 55/429 |

OTHER PUBLICATIONS

Elastec / American Marine, Introducing Drumit—The drum filling vacuum head with auto shut off, undated, 1 page product brochure.

* cited by examiner

Primary Examiner—Richard L. Chiesa
(74) Attorney, Agent, or Firm—Sean W. Goodwin (57) ABSTRACT

A universal drum lid for vacuum systems includes an inlet port configured to intercept downwardly flowing influent at a baffle and engage a direction plate which redirects the flow laterally against an adjacent side wall of the receptacle. An outlet port is shielded by the direction plate. Maximum liquid removal and minimal liquid carryover is achieved through the use of the drum lid. Preferably, a disengagement chamber precedes the baffle for disengaging suspended particles, including liquid, and permitting debris to pass the baffle without blockage. A single float ball-valve is sensitive to flow and will seal the outlet on high liquid entrainment and on high liquid levels.

16 Claims, 6 Drawing Sheets

Fig. 10 ent has found

DRUM LID FOR MINIMAL LIQUID CARRYOVER IN A VACUUM SYSTEM

FIELD OF THE INVENTION

The present invention relates generally to a lid for open top containers in a vacuum system for facilitating the removal of solids and liquids from an air stream. More particularly, the invention relates to a lid which is adaptable to open-top containers, minimizes liquid carryover out of the container, and enables liquid level control.

BACKGROUND OF THE INVENTION

In the area of environmental clean up, vacuum systems are frequently used to recover liquids, sludge and dry products. In such cases it is useful to remove these recovered particles or liquid from the stream of air prior to the stream entering the main vacuum system. Conventional systems comprise a vacuum generating device, a suction source line extending between the vacuum generating device and an outlet port on an intermediate collection receptacle, and suction wand connected to an inlet port to the receptacle.

Intermediate collection receptacles are often utilized in situations where one does not want hazardous materials carried though to a main vacuum source. Receptacles such as drums and canisters are inexpensive, readily available and can hold a large amount of particulates and liquid. Furthermore, once a drum or canister is full it can be transported to a disposal or storage site, should this be required.

As is typically the case with accidental spills, the liquid can be hazardous including having flammable characteristics. Vacuuming can volatilize or atomize the liquid which can accentuate the hazard if entrained in the discharged flow and carryover beyond the collection container.

In U.S. Pat. No. 5,525,396 to Rudolph et al. a particle collector lid is described. This lid is adapted to close off the upper end of a container and provides inlet and outlet chambers shaped so as to direct air entering the container to flow in a curved and downwardly inclined direction. This directing of air establishes a cyclonic action in the container which results in separating out larger particles, such as wood chips, from the air stream. However, the device disclosed by Rudolph et al. does not work well when extracting liquids from a stream of air for a number of reasons. First, the cyclonic action does not encourage knock-out of liquid from the air stream and some entrained liquid will exit through the outlet chamber and into the main vacuum system. Second, once the container is full, any additional liquid overflows into the outlet chamber and is likewise sucked into the main vacuum system.

A transparent lid, as taught by U.S. Pat. No. 6,210,457 to Siemers, allows an operator to visually inspect the amount of particles or liquid collected in a container. However, such a device still requires continuous observation of the growing amount of liquid inside and risks liquid overflowing into the main vacuum system if left unobserved. This device also does not address the liquid entrainment problem.

One device that prevents an overflow of liquid into the main vacuum system is the DrumIt™ device manufactured by Elastec Inc. of Carmi, Ill. The DrumIt™ lid includes a two-ball valve at the container exit to shut off the air flow when the drum is full of liquid. However, from experience the applicant has found that interaction of the two balls can result in an improper seal. Furthermore, applicant has found this system to have a high entrained liquid carryover. Applicant hypothesizes that stream of air and liquid is directed against the bottom of the container (or top any collected liquid) which results in some of the liquid remaining entrained in the stream of air or being re entrained. The two-ball valve is insensitive to increased liquid carryover, activates only upon high liquid contact and is slow to respond. These deficiencies limit the DrumIt™ device's ability to remove liquid from the stream of air resulting in passage of a higher than desirable amount of liquid to the vacuum generating device.

In U.S. Pat. No. 5,970,573 to Lahaye, spray and incoming mist is discharged from a nozzle at an inlet port and is directed downwardly to the bottom of the container, deliberately away and separated from the outlet port and vacuum blower by a depending weir or direction plate. Lahaye has attempted to address the entrainment problem to some extent, however, like the DrumIt™ device, liquid entrainment can still result and the direction plate extends deeply into the container affecting its fill capacity.

Accordingly, there is still a need for an apparatus and method for adapting to easily procured receptacles such as drums, that limit liquid entrainment in a stream of air, and that provide reliable shut off in high liquid situations. Additionally a need exists, beyond the prior art, for a device or method to control accumulations of liquid so as to maximize vacuuming operation.

SUMMARY OF THE INVENTION

In one aspect of the present invention, a universal drum lid for vacuum systems is provided for fitting to open top receptacles and maximizing liquid knockout, minimizing liquid entrainment resulting in liquid carryover from the receptacle.

In another aspect of the invention, a lid is provided for superior liquid collection management while retaining the ability to maximize liquid knockout and minimize liquid carryover from the receptacle.

In one embodiment of the invention, an inlet port is configured to intercept downwardly flowing influent with a baffle and redirect the flow perpendicularly or laterally against an adjacent side wall of the receptacle which is opposing or away from the ultimate exit. Through the addition of a preferred disengagement chamber above the baffle, influent velocity is reduced for disengaging suspended particles, including liquid, and permitting debris to pass the baffle without blockage. Preferably the baffle is suspended below the lid and in the path of the influent by a blocking plate which isolates the inlet port from the outlet port. For minimizing liquid carryover out of the outlet port, preferably the outlet port comprises a single float ball-valve which is configured to close the outlet port even prior to the float ball contacting a collected high liquid level surface.

In another aspect of the invention, a drum lid is provided which includes a combination of elements which enable substantially continuous management of liquid collection and removal. The preferred lid includes a downcorner conduit which is adapted for connection to a liquid removal device such as a suction pump. Such a system draws any collected liquid from a location sufficiently below the outlet port so that the float ball is not actuated and the characteristics of the flow steam approaching the outlet port do not actuate the ball valve. In the case of a conventional drum, it is advantageous to extend the conduit to the bottom of the drum.

Accordingly, in a broad aspect of the invention, a planer lid is provided comprising an inlet port fit into and located adjacent a periphery of the lid and oriented for receiving the mixed stream and redirecting it downwardly into the container adjacent a vertical side wall; a baffle spaced from and positioned below the inlet port so as to intercept the mixed stream and redirect the stream laterally; a plate depending from the lid adjacent the inlet port and extending downwardly to the baffle for blocking at least a portion of the laterally redirected stream so that substantially all of the laterally redirected stream is towards the side wall for removing a substantive amount of liquid from the mixed stream; and an outlet port fit into the lid and adapted for connection to a vacuum source, the outlet port spaced from the inlet port and plate for discharge of the gas stream.

Preferably, the lid comprises a chamber to which the inlet port is connected, the chamber having greater lateral dimensions than the inlet port and the baffle. More preferably, the chamber is raised above the planer lid so as to enable closer spacing of the baffle to the lid.

In another aspect, a conduit is also depending from the lid to a suction end for engaging collected liquid and when adapted to a pump, liquid can be withdrawn on a substantially continuous basis.

DETAILED DESCRIPTION OF THE PREFERRED EMBODIMENTS

Figure 1:
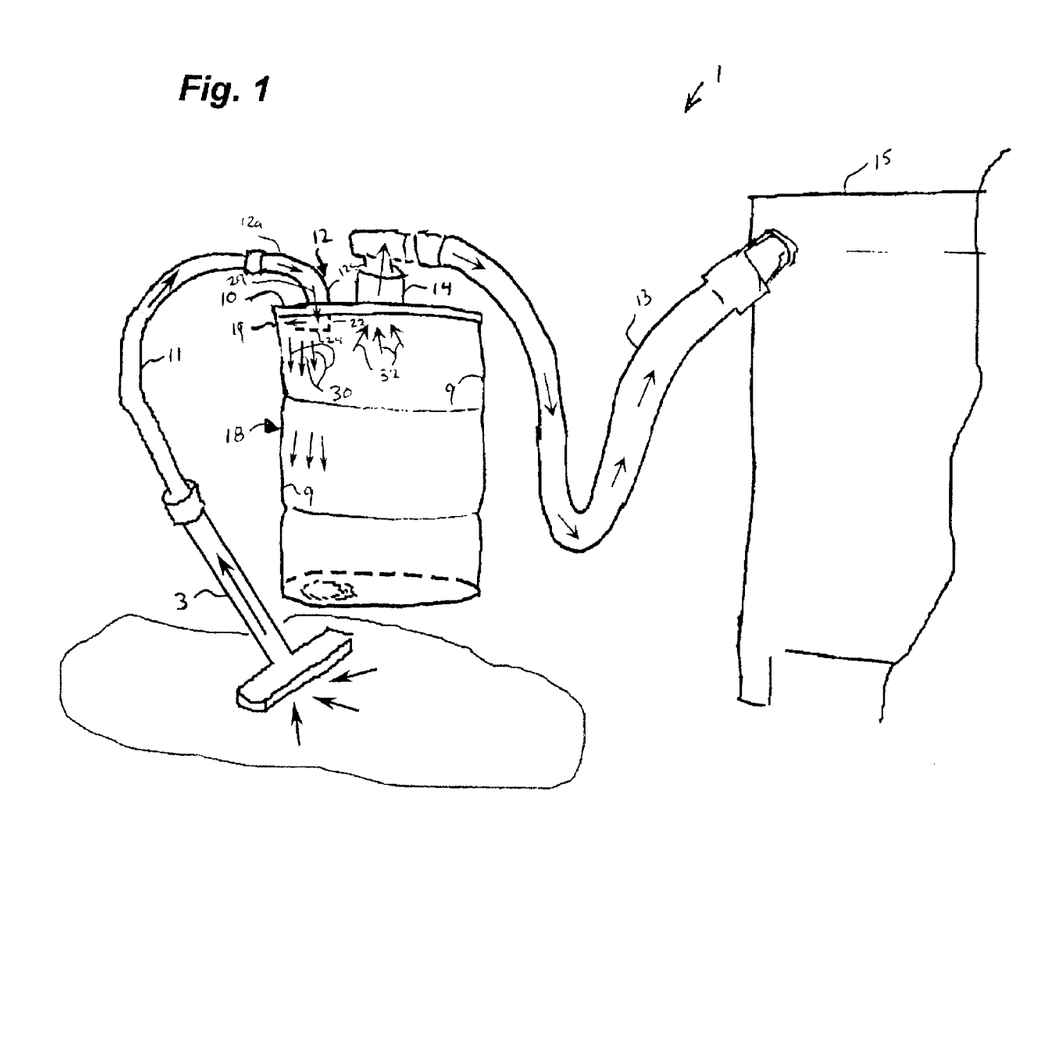
FIG. 1 is an overall view of the one embodiment of the invention including the vacuum source, drum and wand.
Figure 2:
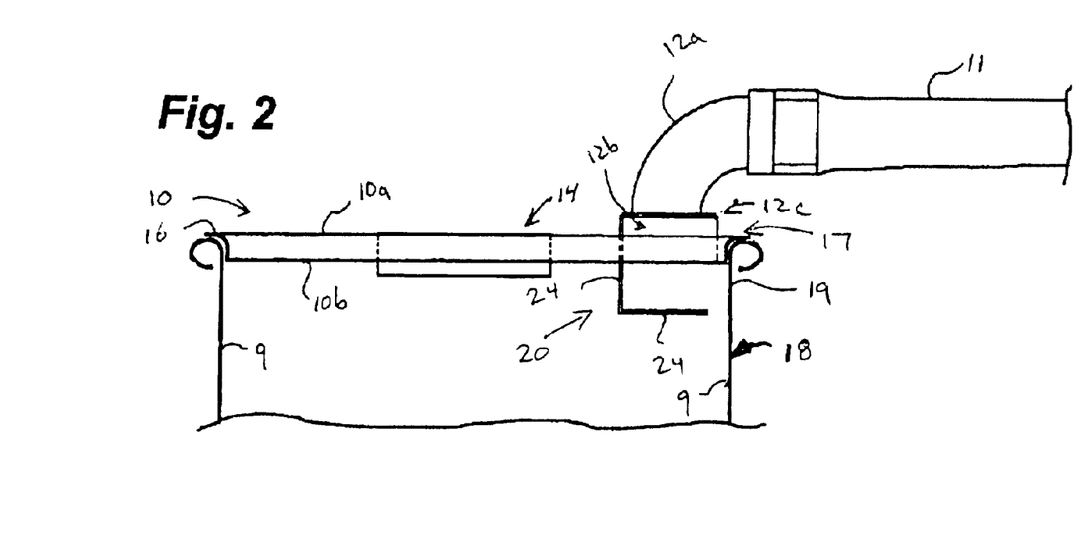
FIG. 2 is a partial side view of an embodiment of the drum lid affixed to a drum (shutoff valve omitted for clarity)
Figure 3:
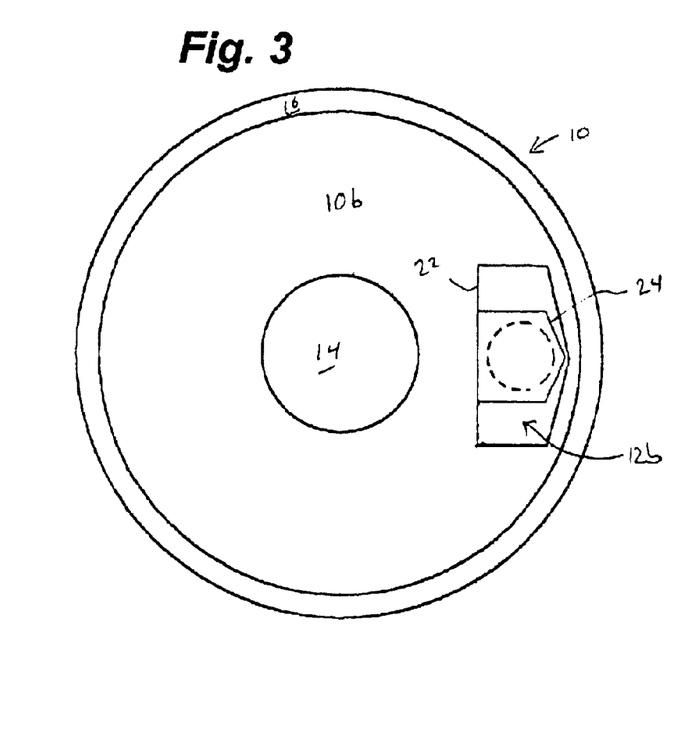
FIG. 3 is an underside plan view of the drum lid according to FIG. 2.
Figure 4:
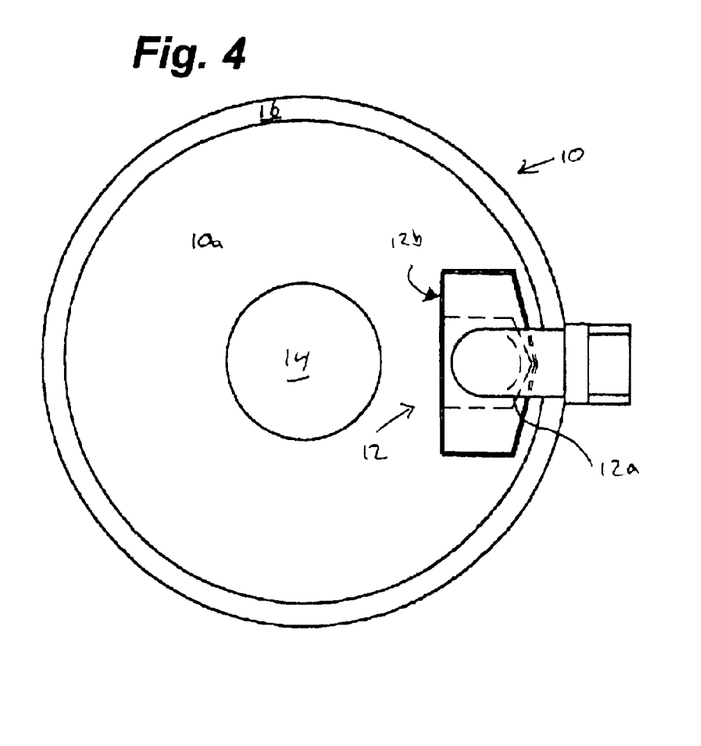
FIG. 4 is a top plan view of the drum lid according to FIG. 2.
Figure 5:
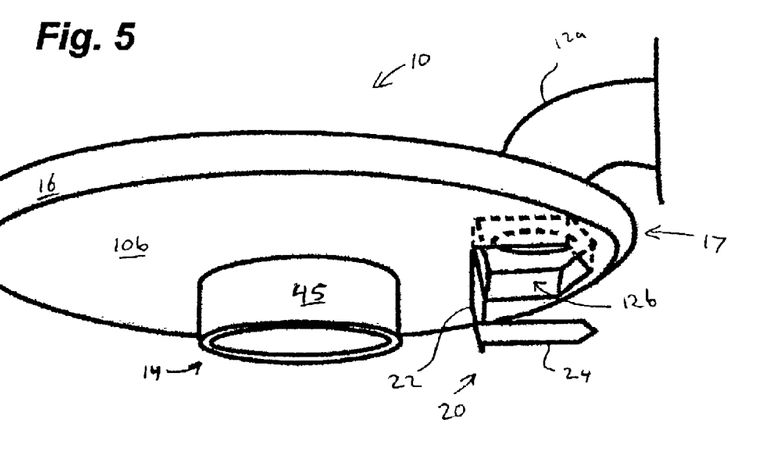
FIG. 5 is a perspective view of the lid of FIG. 2 illustrating the inlet port, and baffle.

FIG. 1 illustrates a vacuum system 1 comprising a vacuum source 15, a suction source line 13 extending between the vacuum source 15 and an outlet port 14 on an intermediate collection receptacle 18, a suction wand 3, and a debris hose 11 connected to an inlet port 12 at the receptacle 18. The source line 15 and debris hose 11 are conduits capable of accepting working vacuum without collapse. The receptacle 18 is a container or drum having a closed bottom, vertical side walls 9, an open top 19 and has a detachable or removable lid 10. Typical vacuum at the drum 18 is about 7 inches wc. Suitable controls known to those of skill in that art are applied to the system to ensure safe operation including shutoff controls to avoid over-vacuum collapse of the hose or container. With pressure controls set at 9–10 inches wc, conventional drums with 18 gauge wall thickness can be used.

With reference to FIGS. 1–5, one embodiment of the lid 10 is a flat plate or planer structure which is sized for the drum 18 and which has a periphery 17 which is adapted to seal to the drum's open top 19.

The debris hose is 11 is connected to the inlet port 12 which is located near the periphery 17 of the lid 10. The suction line 13 is connected to the outlet port 14 which is generally located at the center of the lid 10. The suction source line 13 connects to the vacuum source 15. Preferably, the vacuum source 15 is a regenerative blower such as model 2BH1600 available from Siemens of Germany. A blower 15 provides a low temperature driver for moving the air flow. It is particularly advantageous to use a non-roots type blower as some waste liquid may be flammable and positive displacement blowers create a high temperature ignition source. More preferably, the blower 15 is driven by a diesel engine thereby further avoiding electrical ignition sources.

The planer structure of the lid 10 has upper and lower surfaces 10a, 10b and an edge 16 at the periphery 17 that is suitable for engaging the top opening 19 of the drum 18. A suitable drum 18 is a 45 US Gal. or 200 liter barrel or drum. Drums for receiving hazardous influent include those approved pursuant to Canadian legislation, specifically the Transportation of Dangerous Goods Act. The lid 10 is generally circular and generally closes off the top opening 19 of the drum 18. In this embodiment the diameter of the lid 10 is approximately 22" so as to fit over, and seal the open top 19 of the approved 200 liter drum 18.

The lid's inlet port 12 and an outlet port 14 enable the flow of air into, and out of, the drum 18 as is shown by arrows 30, 32 (FIG. 1).

The inlet port 12 is formed by a linear section of conduit 12c preferably connected near the periphery 17 of the lid 10. The debris hose 11 connects inline with the conduit 12c so as to direct influent substantially downwardly 29 through the lid 10 and into the drum 18. The influent is an air stream typically comprising air and possibly further comprising a mixed stream of air, liquid, particulates and any other debris.

The inlet port 12 has a flow modifying structure 20 which acts to redirect the incoming influent and thereby minimize carryover of liquid to the outlet port 14. This flow modifying structure 20 has an "L"-shaped profile in section and comprises a horizontal baffle 24 and a vertical plate 22 depending from the lid 10. The plate 22 is located intermediate the inlet port 12 and the outlet port 14. The baffle 24 interrupts and re-directs the air stream 30 substantially laterally within the drum 18 and the plate 22 blocks a portion of the lateral flow and thereby limits the air stream to a 180 sweep directed laterally at the wall of the drum 18. Conveniently, the plate 22 also serves to support the baffle 24 from the lid 12.

Preferably, the flow modifying structure 20 further comprises an abrupt widening of the inlet port 12 which is achieved by provision of a chamber 12b formed in the lid 10 and located prior to the baffle 24. The air stream is affected in at least several ways, all of which aid in minimizing liquid entrainment and reliability of operation. First, the abrupt increase in cross-sectional flow area, before reaching the drum 18 causes a relatively rapid reduction in velocity of the air stream. Secondly, the chamber 12b provides a much wider inlet port 12 prior to the baffle 24 thereby being less likely to be blocked by bulky debris.

The increase in cross-sectional area first at the chamber 12b and then into the drum 18, and further through the abrupt change in air stream flow at the baffle 24 appear to cause a large portion of the entrained liquid to precipitate out into the drum 18 and avoid re-entrainment. The baffle 24 is positioned directly below the inlet port 12 and intercepts the fastest flowing of the air stream and directs the air stream substantially towards the side of the drum 18 at an angle substantially more towards the perpendicular than in a typical cyclonic vacuum system. The baffle 24 has a surface area comparable to the cross sectional area of the inlet port 12 just prior to the chamber 12b and is positioned substantially vertically below the inlet port 12. The baffle 24 is smaller than the cross-sectional area of the chamber 12b thereby providing greater free space for the passage and release of debris into the drum 18. In the preferred embodiment, the baffle 24 is attached to the distal end of the plate 22, being spaced slightly below the lower surface 10b. Such a baffle 24 is optimally arranged for intercepting the Influent entering through the inlet port 12 while at the same time not acting as a collecting platform for debris that may happen to be mixed in the stream of air and liquid (as is common in environmental clean ups in areas of muskeg). However, larger baffles having differing relative dimensions could be utilized, especially in cases where entrained debris is not a problem.

For maximum utility, when vacuuming liquid materials into the drum 18, it is often desirable to allow the container 18 to be filled with as much liquid as possible before the lid 10 ceases to function properly. One approach is to position the baffle 24 as close to the lid's lower surface 10b as possible but far enough to allow for debris to flow past the baffle 24. Advantageously, the chamber 12b is connected to the lid's upper surface 10a, and extends thereabove so as to minimize the projection of the baffle 24 into the drum 18. A curved conduit 12a is connected between the inlet port 12 and the suction source line 13.

Figure 6:
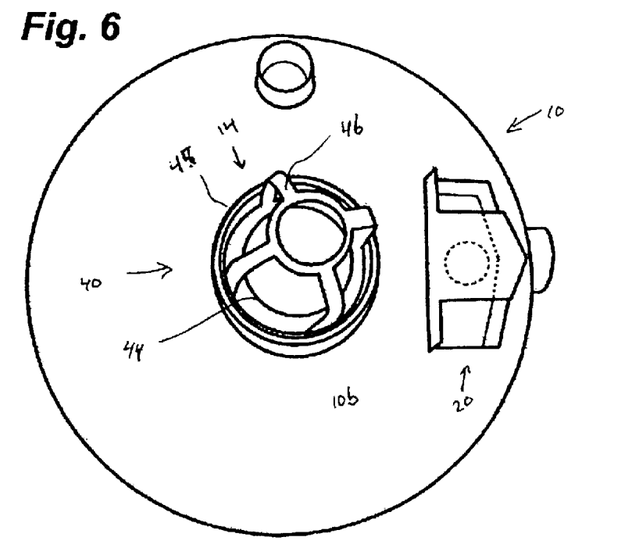
FIG. 6 is an underside plan view of an embodiment of the drum lid of FIG. 2 with a shutoff valve attached.
Figure 7:
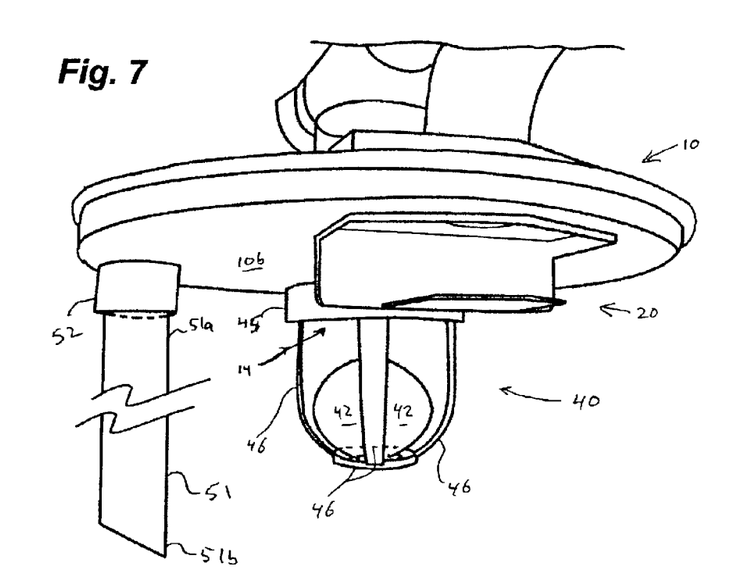
FIG. 7 is a side perspective view of another embodiment of the drum lid having a conduit for liquid removal fit thereto.
Figure 8:
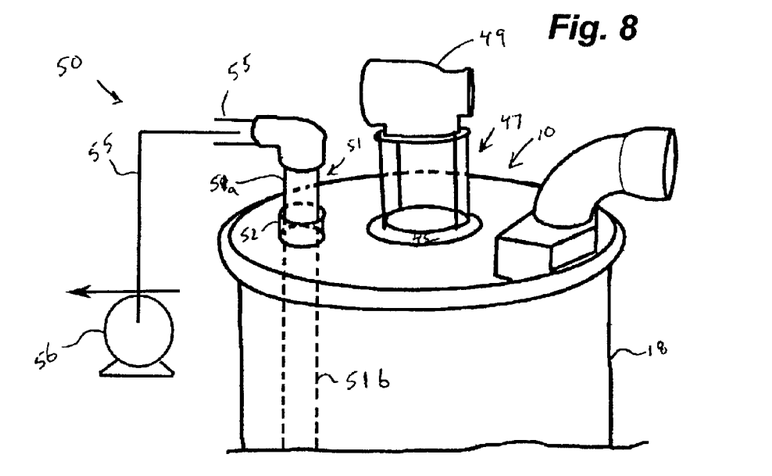
FIG. 8 is a top perspective view of the lid of FIG. 7, fit to a drum and having a schematic representation of a suction pump connected to the suction conduit.
Figure 9:
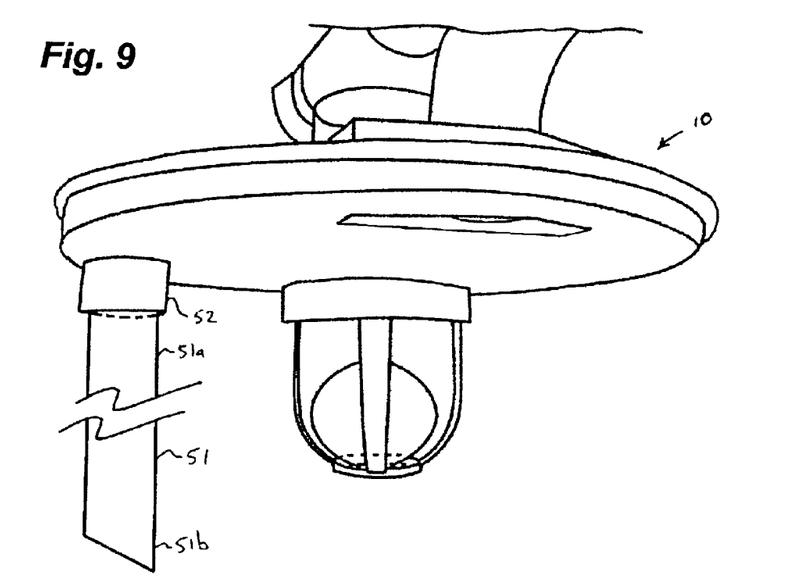
FIG. 9 is a side perspective view of another embodiment of the drum lid having a conduit for liquid removal fit thereto.
Figure 10:
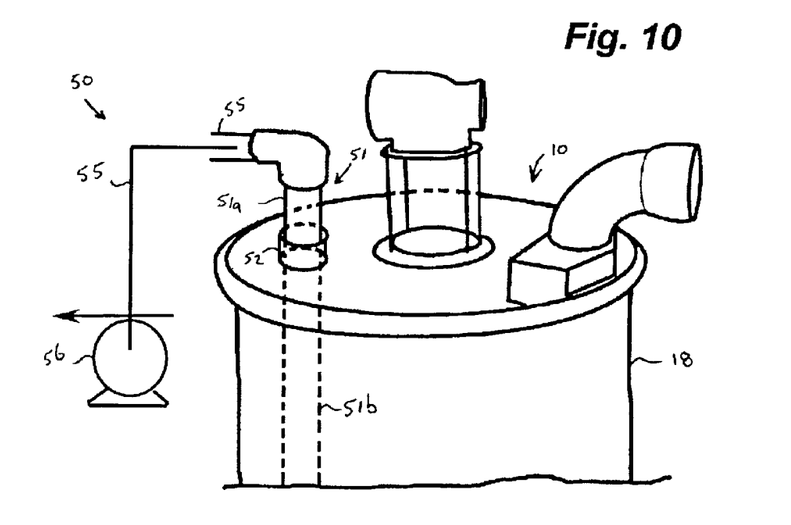
FIG. 10 is a top perspective view of the lid of FIG. 9, fit to a drum and having a schematic representation of a suction pump connected to the suction conduit.

Now referring to FIGS. 6–7 in an additional embodiment, a novel ball valve arrangement 40 is fit to the outlet port of the lid 10 for maximizing air stream therethrough while reducing the risk of liquid carryover. The valve 40 projects minimally into the drum 18 for maximum drum storage capacity. The valve 40 utilizes a single ball 42 constrained inside a frame or cage 46. Unlike conventional double ball-type liquid level arrangements, a ring seal 44 is located at the lid interface 10b which ensures effective sealing when the flow dynamics around the ball 44 sense the passage of dense, liquid entrained flow such as that which can occur just prior to liquid level shutoff.

More specifically, a collar 45 is fit to the outlet port 14 of the lid 10. The collar 45 has a bore which is threaded for coupling with the valve 40 below the lid 10 and with the vacuum source line 13 above the lid 10. The collar 45 is fit with an elastomeric ring seal 44 at the interface of the cage 46 and collar 45 for cooperating with the ball 42 in sealing the outlet port 14. Preferably, the collar 45 is fit with a sight glass 47 and tee 49 before connecting to the vacuum source line 13.

The cage 46 projects downwardly, into the drum 18, for supporting the ball 42 underneath the lid 10. The ball 42 is able to travel vertically inside the cage 46 in response to the passage of dense, liquid entrained air flow. This valve arrangement 40 of a single responsive ball 42, a positive seal 44 at the lid interface 10b and a minimum travel cage 46 results in a maximum sensitivity and effective shut-off upon the presence of dense, liquid entrained flow.

As stated earlier, there is an ongoing concern regarding liquid storage capacity of a drum 18 and the risk of higher liquid entrainment and resultant carryover as liquid levels approach the lid. Accordingly in two other embodiments, and referring to FIGS. 7–8 and 9–10, the lid 10 is further enhanced through the addition of a liquid withdrawal system 50 for substantially continuous and ongoing removal of liquids from the drum 18 while operating under vacuum. To accommodate the system 50, the lid 10 is fit with a coupling or liquid withdrawal port 52 and conduit or stinger 51 depending therefrom. The stinger 51 extends downwardly for engaging any collected liquids. The stinger 61 comprises a pump end 51a at the liquid withdrawal port 52 and a suction end 51b extending downwardly. Specifically, the stinger 51 extends from the liquid withdrawal port 52 at the lid 10 and with the suction end 51b extending downwardly to towards the bottom of the drum 18.

The liquid withdrawal port 52 is adapted for connection to a suction line 55 for connecting the stinger 51 to a pump 56 for withdrawal of accumulated liquids from the container or drum 18. Preferably, and so as to maintain the integrity of the vacuum system 1 while operating, the pump 56 is a positive displacement pump. Alternatively, a different type of pump 56 could be used if a check valve (not shown) were to be placed between the pump 56 and the stinger 51.

EXAMPLE

As shown in the FIGS. 1–8, in one application of the invention, a 250 scfm blower constituting the vacuum source 15 was fit to a 200 liter open top drum 18. A lid clamp secured the lid 10 to the drum 18. The lid 10 was approximately 22" in diameter. A 3" pipe inlet port 12 is coupled to a disengagement chamber 12b which measures about 3½" by 8" wide by about 2" high above the lid 10. The direction plate 22 extends downwardly from the lid 10 about 2" with a 8" width to redirect influent away from the outlet port 14. A baffle 24 is positioned substantially centered below the inlet port 12. The baffle plate 24 is supported by the direction plate 22 and extends laterally towards the periphery of the lid 10 and thus towards the drum wall. The baffle 24 is smaller than the chamber opening and measures approximately 3½" laterally or radially and about 4" in width or 4" shorter than the chamber width and providing about 2" free either side of the baffle plate 24 for shedding debris. Direction plates 22 of other dimensions could be utilized as long as the plate 22 is of a sufficient size to direct the air stream away from the outlet port 14 and to support the baffle 24. Baffles 24 of other dimensions could be utilized, especially in cases where entrained debris is not a problem. This chamber 12b enables the baffle 24 to be close to the lid's lower surface 10b while preventing debris from being caught in the inlet 12 by the baffle 24. A 6" diameter outlet port 14 is fit with a ring seal 44 which seals against a conventional 6" ball 42. The lid collar 45 is fit with a sight glass 47 and tee 49 before connecting to the vacuum source line 13. Quick connect couplings are provided at both the inlet port 12 and for the vacuum source line 13.

The advantages of the system include:

decreased liquid entrainment and carryover in a stream of air;

maximum sensitivity and effective shut off upon the presence of dense, liquid entrained flow;

decreased debris collection and blockage in the inlet port; and the capability of ongoing removal of liquids from the drum while operating under vacuum.

The Embodiments of the invention in which an exclusive property or privilege is being claimed are defined as follows:

1. A container lid for receiving an influent of gas and liquid and discharging a substantially liquid free gas stream, said lid comprising:

upper and lower planer surfaces and adapted for detachably sealing a top opening of a container having vertical side walls, an inlet port fit into and located adjacent a periphery of the lid and oriented for receiving the influent and redirecting the influent downwardly into the container adjacent a vertical side wall;

a baffle spaced from and positioned below the inlet port so as to intercept the influent and redirect the influent laterally;

a plate depending from the lid adjacent the inlet port and extending downwardly to the baffle for blocking at least a portion of the laterally redirected influent so that substantially all of the laterally redirected influent is towards the side wall for removing a substantive amount of liquid from the influent; and an outlet port fit into the lid and adapted for connection to a vacuum source, the outlet port spaced from the inlet port and plate for discharge of the gas stream.

2. The lid of claim 1 wherein the baffle is suspended from the plate.

3. The lid of claim 1 further comprising a chamber fit between the inlet port and the lid, the chamber further comprising:

an inlet surface to which the inlet port is fit, the inlet port having a cross-sectional area through which the influent flows into the chamber; and peripheral walls spacing the inlet surface from the lid, forming a bottom opening exiting into the container and having a cross-sectional area greater than that of the inlet port.

4. The lid of claim 2 further comprising a chamber fit between the inlet port and the lid, the chamber further comprising:

an inlet surface to which the inlet port is fit, the inlet port having a cross-sectional area through which the influent flows into the chamber; and peripheral walls spacing the inlet surface from the lid, forming a bottom opening exiting into the container and having a cross-sectional area greater than that of the inlet port.

5. The lid of claim 1 further comprising a shut-off valve fit to the outlet port.

6. The lid of claim 4 further comprising a shut-off valve fit to the outlet port.

7. The lid of claim 5 wherein the shut-off valve comprises a ring seal at the lid, a frame depending downwardly from the lid and having a bottom for supporting a bail operable in the frame between a top closed position against the ring seal and a bottom open position at the bottom of the frame.

8. The lid of claim 6 wherein the shut-off valve comprises a ring seal at the lid, a frame depending downwardly from the lid and having a bottom for supporting a ball operable in the frame between a top closed position against the ring seal and a bottom open position at the bottom of the frame.

9. The lid of claim 1 wherein the lid further comprises a sight glass positioned between the lid and the outlet port.

10. The rid of claim 7 wherein the lid further comprises a sight glass positioned between the lid and the outlet port.

11. The rid of claim 8 wherein the lid further comprises a sight glass positioned between the lid and the outlet port.

12. The lid of claim 1 further comprising a conduit having a pump end at the lid and depending downwardly to a suction end positioned in the drum, the pump end being adapted for connection to a pump for withdrawal of accumulated liquids from the container.

13. The lid of claim 2 further comprising a conduit having a pump end at the lid and depending downwardly to a suction end positioned in the drum, the pump and being adapted for connection to a pump for withdrawal of accumulated liquids from the container.

14. The lid of claim 3 further comprising a conduit having a pump end at the lid and depending downwardly to a suction end positioned in the drum, the pump end being adapted for connection to a pump for withdrawal of accumulated liquids from the container.

15. The lid of claim 4 further comprising a conduit having a pump end at the lid and depending downwardly to a suction end positioned in the drum, the pump end being adapted for connection to a pump for withdrawal of accumulated liquids from the container.

16. The lid of claim 11 further comprising a conduit having a pump end at the lid and depending downwardly to a suction end positioned in the drum, the pump end being adapted for connection to a pump for withdrawal of accumulated liquids from the container.

* * * * *